(12) United States Patent
Kozlovsky et al.

(10) Patent No.: US 9,431,037 B2
(45) Date of Patent: Aug. 30, 2016

(54) SYSTEMS AND METHODS FOR MONITORING THE POWER OF A LIGHT SOURCE UTILIZED IN ENERGY-ASSISTED MAGNETIC RECORDING

(71) Applicant: Western Digital (Fremont), LLC, Fremont, CA (US)

(72) Inventors: William J. Kozlovsky, Sunnyvale, CA (US); Lei Wang, Fremont, CA (US); Arkadi B. Goulakov, Fremont, CA (US); Khiem Ba Do, Portola Valley, CA (US)

(73) Assignee: Western Digitatl (Fremont), LLC, Fremont, CA (US)

( * ) Notice: Subject to any disclaimer, the term of this patent is extended or adjusted under 35 U.S.C. 154(b) by 182 days.

(21) Appl. No.: 13/797,266

(22) Filed: Mar. 12, 2013

(65) Prior Publication Data
US 2014/0269236 A1  Sep. 18, 2014

(51) Int. Cl.
| | | |
|---|---|---|
| *G11B 11/00* | (2006.01) |
| *G11B 5/127* | (2006.01) |
| *G11B 13/08* | (2006.01) |
| *G11B 5/31* | (2006.01) |
| *G11B 5/39* | (2006.01) |
| *G11B 5/147* | (2006.01) |
| *G11B 5/60* | (2006.01) |
| *G11B 5/00* | (2006.01) |

(52) U.S. Cl.
CPC ............... *G11B 5/314* (2013.01); *G11B 5/127* (2013.01); *G11B 5/1475* (2013.01); *G11B 5/3109* (2013.01); *G11B 5/3176* (2013.01); *G11B 5/3903* (2013.01); *G11B 5/6088* (2013.01); *G11B 2005/0021* (2013.01); *Y10T 29/49032* (2015.01)

(58) Field of Classification Search
CPC ........... G11B 2005/0021; G11B 5/105; G11B 5/314; G11B 5/4826; G11B 5/4866; G11B 5/4873; G11B 5/6088; G11B 2005/0002; G11B 5/3116; G11B 5/486; G11B 7/1387; Y10T 29/49032

See application file for complete search history.

(56) References Cited

U.S. PATENT DOCUMENTS

| | | | |
|---|---|---|---|
| 6,075,673 | A | 6/2000 | Wilde et al. |
| 6,097,575 | A | 8/2000 | Trang et al. |
| 6,115,398 | A | 9/2000 | Jiang |
| 6,125,014 | A | 9/2000 | Riedlin, Jr. |
| 6,125,015 | A | 9/2000 | Carlson et al. |
| 6,130,863 | A | 10/2000 | Wang et al. |
| 6,137,656 | A | 10/2000 | Levi et al. |

(Continued)

FOREIGN PATENT DOCUMENTS

JP   2008010026 A   1/2008

*Primary Examiner* — Dionne H Pendleton

(57) ABSTRACT

Aspects of the present invention relate to energy-assisted magnetic recording (EAMR), an EAMR assembly, and methods for fabricating the same. In several embodiments, an EAMR head includes a sub-mount on a slider that has a waveguide configured to receive light from a light source attached to a surface of the sub-mount. The waveguide receives the light at a top surface of the slider and routes the light to be near an air bearing surface (ABS) of the slider where energy of the light can be used to heat up a spot on a recording media disk that is proximate the ABS. The waveguide also routes a portion of the light back to the top surface of the slider where the light exits the waveguide and is detected by a light detector located along the surface of the sub-mount.

63 Claims, 10 Drawing Sheets

(56) References Cited

U.S. PATENT DOCUMENTS

| | | | |
|---|---|---|---|
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,627,096 B2 | 9/2003 | Sherrer et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,703,677 B2 | 3/2004 | Lee et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,784,512 B2 | 8/2004 | Yamaguchi et al. |
| 6,796,018 B1 | 9/2004 | Thornton |
| 6,796,723 B2 | 9/2004 | Kim et al. |
| 6,801,402 B1 | 10/2004 | Subrahmanyam et al. |
| 6,853,665 B2 | 2/2005 | Franke |
| 6,856,489 B2 | 2/2005 | Hawwa et al. |
| 6,858,871 B2 | 2/2005 | Okada |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,982,843 B2 | 1/2006 | Coffey et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,217,955 B2 | 5/2007 | Hamaoka et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,502,397 B2 | 3/2009 | Naganuma |
| 7,522,649 B2 | 4/2009 | Ha et al. |
| 7,593,190 B1 | 9/2009 | Thornton et al. |
| 7,595,963 B1 | 9/2009 | Chen et al. |
| 7,608,863 B2 | 10/2009 | Oda et al. |
| 7,616,405 B2 | 11/2009 | Hu et al. |
| 7,710,686 B2 | 5/2010 | Kim et al. |
| 7,729,089 B1 | 6/2010 | Hogan |
| 7,796,487 B2 | 9/2010 | Chu et al. |
| 7,898,759 B2 | 3/2011 | Matsumoto et al. |
| 7,995,310 B1 | 8/2011 | Pan |
| 8,024,748 B1 | 9/2011 | Moravec et al. |
| 8,081,400 B1 | 12/2011 | Hu |
| 8,087,973 B1 | 1/2012 | Sladek et al. |
| 8,089,730 B1 | 1/2012 | Pan et al. |
| 8,125,856 B1 | 2/2012 | Li et al. |
| 8,149,653 B2 * | 4/2012 | Shimazawa ............ G11B 5/105 369/112.27 |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,339,905 B2 * | 12/2012 | Rausch ................ G11B 5/02 369/13.33 |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,670,295 B1 | 3/2014 | Hu et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2002/0089913 A1 | 7/2002 | Moriyama et al. |
| 2006/0233061 A1 | 10/2006 | Rausch et al. |
| 2007/0015313 A1 | 1/2007 | Kwak et al. |
| 2008/0056073 A1 * | 3/2008 | Shimizu ................ 369/13.02 |
| 2008/0316872 A1 | 12/2008 | Shimizu et al. |
| 2009/0185459 A1 * | 7/2009 | Matsumoto ............ 369/13.02 |
| 2009/0207580 A1 | 8/2009 | Oshika et al. |
| 2009/0262448 A1 | 10/2009 | Shimazawa et al. |
| 2010/0007980 A1 * | 1/2010 | Kim et al. .............. 360/59 |
| 2010/0020431 A1 | 1/2010 | Shimazawa et al. |
| 2010/0158059 A1 | 6/2010 | Yoshikawa |
| 2010/0315736 A1 | 12/2010 | Takayama et al. |
| 2011/0122735 A1 | 5/2011 | Kato et al. |

(56) References Cited

U.S. PATENT DOCUMENTS

| | | | |
|---|---|---|---|
| 2011/0216635 A1* | 9/2011 | Matsumoto | G11B 5/105 369/13.33 |
| 2011/0267930 A1 | 11/2011 | Hurley et al. | |
| 2012/0163137 A1* | 6/2012 | Wang | G11B 5/3166 369/13.02 |
| 2013/0244541 A1 | 9/2013 | Yaemglin et al. | |
| 2013/0293982 A1 | 11/2013 | Huber | |

* cited by examiner

SYSTEMS AND METHODS FOR MONITORING THE POWER OF A LIGHT SOURCE UTILIZED IN ENERGY-ASSISTED MAGNETIC RECORDING

FIELD

The present invention relates to information storage devices, and more specifically to systems and methods for monitoring the power of a light source utilized in energy-assisted magnetic recording.

BACKGROUND

Conventional energy-assisted magnetic recording (EAMR) disk drives generally include an EAMR assembly (e.g., EAMR head) including a light source (e.g., laser) mounted to a sub-mount which is coupled to a slider that can be suspended over a recording media disk. The sub-mount is helpful to dissipate excess thermal energy from the laser and to provide connectivity for electrical signals to the laser.

Light from the laser is directed by a transducer positioned within the slider to a region of the media disk thereby heating the region. Information can then magnetically be written to the media disk in the region that was heated. As precise control and delivery of the laser energy to the media disk can be important, EAMR systems generally require accurate measurement of the magnitude of laser power delivered to the recording media.

SUMMARY

Aspects of the invention relate to systems and methods for monitoring power of a light source utilized in energy-assisted magnetic recording (EAMR).

In one embodiment, the invention relates to an energy-assisted magnetic recording (EAMR) head. The EAMR head includes a slider that has a waveguide. A sub-mount is attached to the slider, and the sub-mount includes a light detector along a first sub-mount side of the sub-mount and spaced apart from the slider. A light source (e.g., a laser) is attached to the first sub-mount side, and the light source is configured to transmit light to the waveguide. The light detector is configured to receive a first portion of the light transmitted to the waveguide.

In another embodiment, the invention relates to a method for fabricating an energy-assisted magnetic recording (EAMR) head. According to the method, a slider including a waveguide is provided, and a light source is attached to at a first sub-mount side of a sub-mount. The light source is configured to transmit light to the waveguide. In addition, according to the method, the sub-mount is attached to the slider, and the sub-mount includes a light detector along the first sub-mount side of the sub-mount and spaced apart from the slider. In this embodiment, the light detector is configured to receive a first portion of the light transmitted to the waveguide.

In another embodiment, the invention relates to a head-gimbal assembly (HGA). The HGA includes a suspension assembly and the EAMR head as described in the various embodiments throughout this disclosure.

DETAILED DESCRIPTION

Figure 1A:
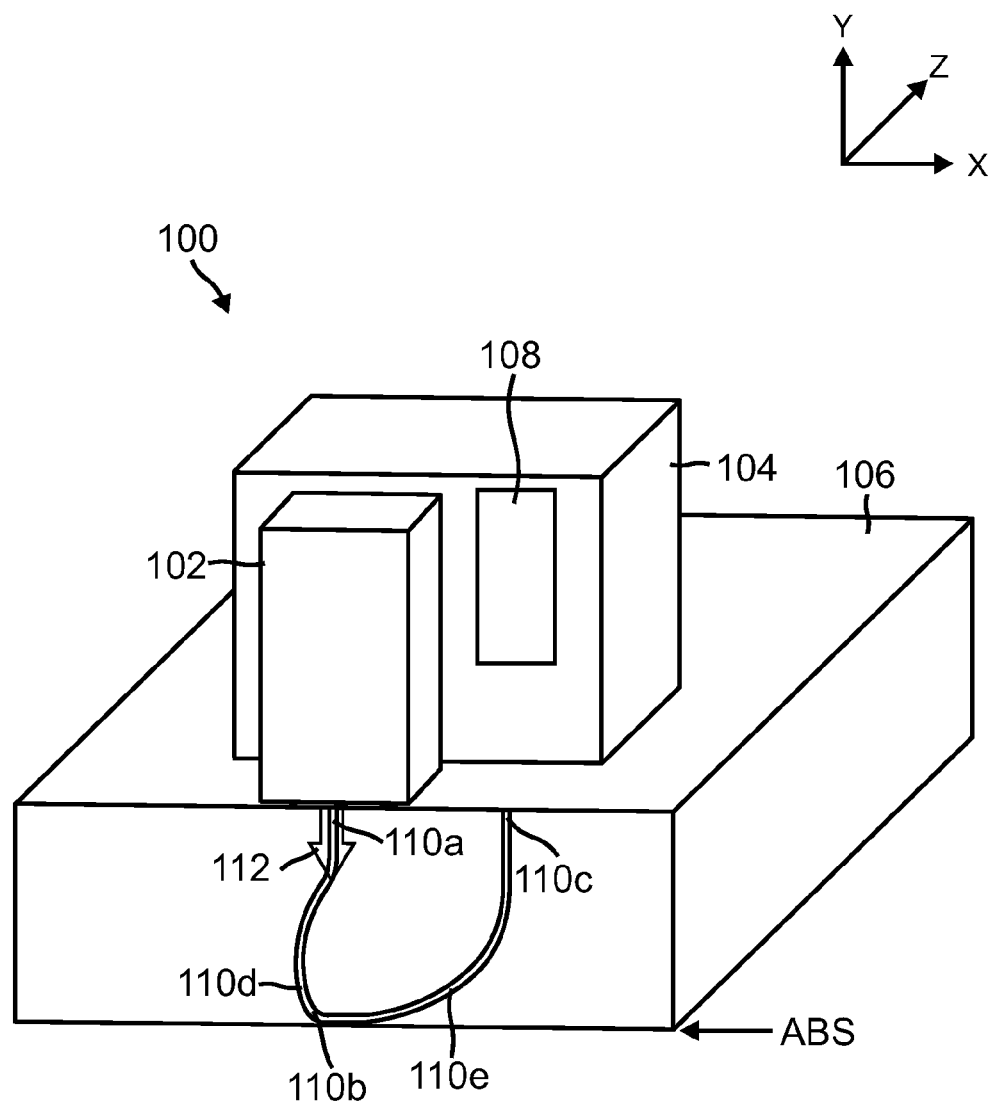
FIGS. 1A and 1B are a perspective view and a side view, respectively, of an energy-assisted magnetic recording (EAMR) assembly configured to monitor the output power of a light source using a light detector in accordance with an embodiment of the present invention.

In some designs, a light detector may be positioned to sample light from the back side of the light source. However, such configuration generally uses a sub-mount that is substantially larger in size than the light source in order to position the light detector at the back side of the light source. The large size of such EAMR assembly is generally not desirable in consideration of head gimbal assembly (HGA) mechanical and flyability requirements in certain EAMR applications. Further, light from the back side of the light source does not always correlate well with light from the front of the light source, especially in the presence of any optical feedback to the front of the light source.

Referring now to the drawings, embodiments of systems and methods for monitoring power of a light source (e.g., laser) utilized in energy-assisted magnetic recording (EAMR) are illustrated that address the problem noted above and those noted in the background section. The systems involve an energy-assisted magnetic recording (EAMR) head including a light source mounted on a sub-mount that is attached to a top surface of a slider. A light detector is attached to or integrated in the sub-mount for monitoring the power of a light beam emitted by the light source by sampling a portion of the light beam after it passes through a waveguide in the slider.

In several embodiments, the waveguide is suitably configured to receive the light beam at the top surface of the slider and route the light beam to be near a writing pole at or near the ABS of the slider where the light beam can be used to heat up a spot on a recording media disk that is proximate the ABS. The waveguide also can route a portion of the light beam back to the top surface of the slider where the light exits the waveguide and is detected by a light detector that is positioned above the waveguide to capture at least a portion of the light from the waveguide. Accordingly, the light source supplies the portion of the light beam monitored by the light detector and the portion of the light used to heat up the media disk using the novel arrangements of the waveguide, the light source, and the light detector, which will described in more detail in various non-limiting embodiments in this disclosure.

Figure 1B:
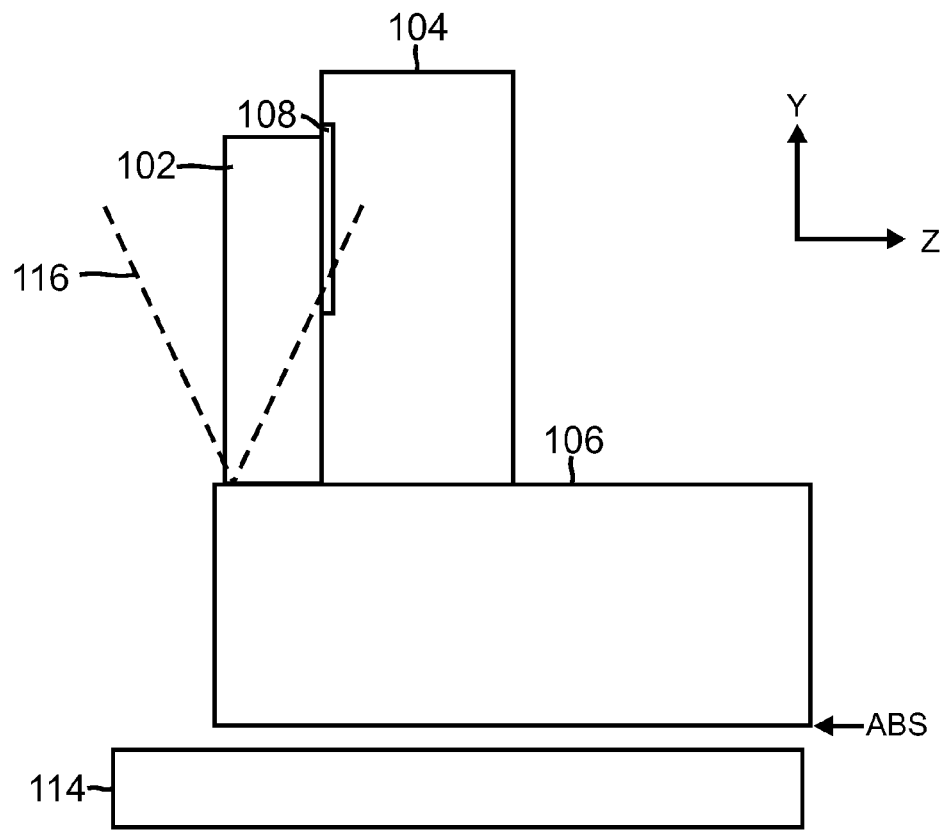

FIGS. 1A and 1B are a perspective view and a side view, respectively, of an EAMR assembly 100 configured to monitor the output power of a light source using a light detector in accordance with an embodiment of the present invention. Referring to FIG. 1A, the EAMR assembly 100 includes a light source 102 (e.g., a laser diode) attached to a first surface of a sub-mount 104 that is mounted on a top surface (or side) of a slider 106. The top surface is opposite to the ABS of the slider 106. In one embodiment, the light source 102 has a rectangular block shape and includes a laser diode for outputting a light beam to the slider 106 below. In one embodiment, the sub-mount 104 has a rectangular block shape, and a light detector 108 is integrated along the first surface of the sub-mount 104. Here, the light source 102 and the light detector 108 are spaced apart on the first surface and have lengths that extend in a height direction (e.g., in the Y direction in FIG. 1A, which is normal to the ABS) of the sub-mount 104.

In one embodiment, the light detector 108 is attached to the first surface of the sub-mount 104. In one embodiment, the sub-mount 104 and the light source 102 have about the same size. In another embodiment, the sub-mount 104 is slightly taller than the light source 102 in the height direction that is normal to the ABS. In one embodiment, the sub-mount 104 may be about 380 microns tall, while the light source 102 may be about 350 microns tall. In one embodiment, the light detector 108 includes a photodiode such as an in-plane photodiode or a discrete photodiode. The light detector 108 may be attached to or integrally formed along the surface of the sub-mount 104.

The slider 106 may include one or more pads (not shown) on the top surface configured to attach to, and be soldered to, pads (not shown) on a bottom surface of the sub-mount 104. The sub-mount 104 may include one or more pads (not shown) on the first surface configured to attach to, and soldered to, pads (not shown) on a back surface of the light source 102.

In one embodiment, the light source 102 has a thickness (e.g., dimension along the Z direction) of about 100 microns, a height (e.g., dimension along the Y direction) of about 350 microns, and a width (e.g., dimension along the X direction) of about 130 microns. In other embodiments, the light source 102 can have other suitable dimensions. In one embodiment, the light source 102 includes a laser that provides about 50 milliwatts. In other embodiments, the light source 102 can provide more than or less than 50 milliwatts. In one embodiment, the light source 102 has a wavelength of about 830 nm. The bottom surface of the light source 102 is on the top surface of the slider 306. In one embodiment, the bottom surface of the light source 102 substantially overlaps with the top surface of the slider 106 (see FIG. 1B).

In one embodiment, the sub-mount 104 has a thickness (e.g., dimension along the Z direction) of about 200 microns, a height (e.g., dimension along the Y direction) of about 380 microns, and a width (e.g., dimension along the X direction) of about 500 microns. In other embodiments, the sub-mount 104 can have other suitable dimensions.

In one embodiment, the slider 106 has a thickness (e.g., dimension along the Y direction) of about 180 microns, a length (e.g., dimension along the Z direction) of about 1235 microns, and a width (e.g., dimension along the X direction) of about 700 microns. In other embodiments, the slider 306 may have other suitable dimensions.

The EAMR assembly 100 also includes a waveguide 110 fabricated in the slider 106 and positioned in such a way as to receive a light beam 112 from the light source 102 at an input end 110a and guide a first portion of the light beam to an NFT portion 110b positioned near an air bearing surface (ABS) of the slider 106 and a second portion of the light beam out of the slider 106 at an exit end 110c toward the light detector 108. In operation, the light source 102 can be activated to produce the light beam 112 that is guided by a first arm 110d of the waveguide to the NFT portion 110b of the slider 106 near the ABS where energy of the light beam 112 can be transferred to a recording media disk 114 (shown in FIG. 1B) below and proximate the ABS.

In more detail, the first arm 110d receives the light beam 112 from the light source 102 and routes the light beam to the NFT portion 110b near a main writing pole (not shown) at or near the ABS where some energy of the light beam can be transferred to the media disk 114 that is located below the slider 106. The area of the media disk 114 receiving the light is heated up by the energy of the light for EAMR application. In some examples, the slider 106 may include a near-field transducer (not shown) that can concentrate the light energy onto a spot on the media disk 114. The waveguide 110 also has a second arm 110e that is optically coupled to the first arm 110d. The second arm 110e receives the second portion of the light beam from the first arm 110d, and routes this portion of the light beam to the exit end 110c where the light exits the second arm 110e in a direction toward the light detector 108. Therefore, the light detector 108 can capture at least a portion of the divergent light that exits from above the slider 106. Different from the EAMR assemblies of the related art, the EAMR assembly 100 is configured such that the light sampled or captured by the light detector 108 and light (or energy) transferred to the media disk both come from the same output of the light source 102. Here, light enters and exits the waveguide 110 at the same side (e.g., top side opposite the ABS) of the slider 106 in substantially opposite directions.

Referring to FIG. 1B, the first portion of the light beam after exiting the second arm 110b has a divergent shape 116. That is, the light beam's width gradually increases in a light propagation direction toward the light detector 108 located along the first surface of the sub-mount 104. Therefore, at least some of the light can be received or captured by the light detector 108. While a photodiode is used as an example of the light detector 108, the present invention is not limited thereto. Other suitable light detectors that can be applied with the sub-mount 104 may be used. In the embodiment of FIG. 1B, the rectangular block shaped light source 102 is mounted such that its output emanates from the side furthest from the sub-mount (e.g., in a "junction up" configuration). In some embodiments, a light source 102 has a configuration in which the light source is mounted such that its output emanates from a side attached or immediately adjacent to the sub-mount (e.g., in a "junction down" configuration).

Figure 2:
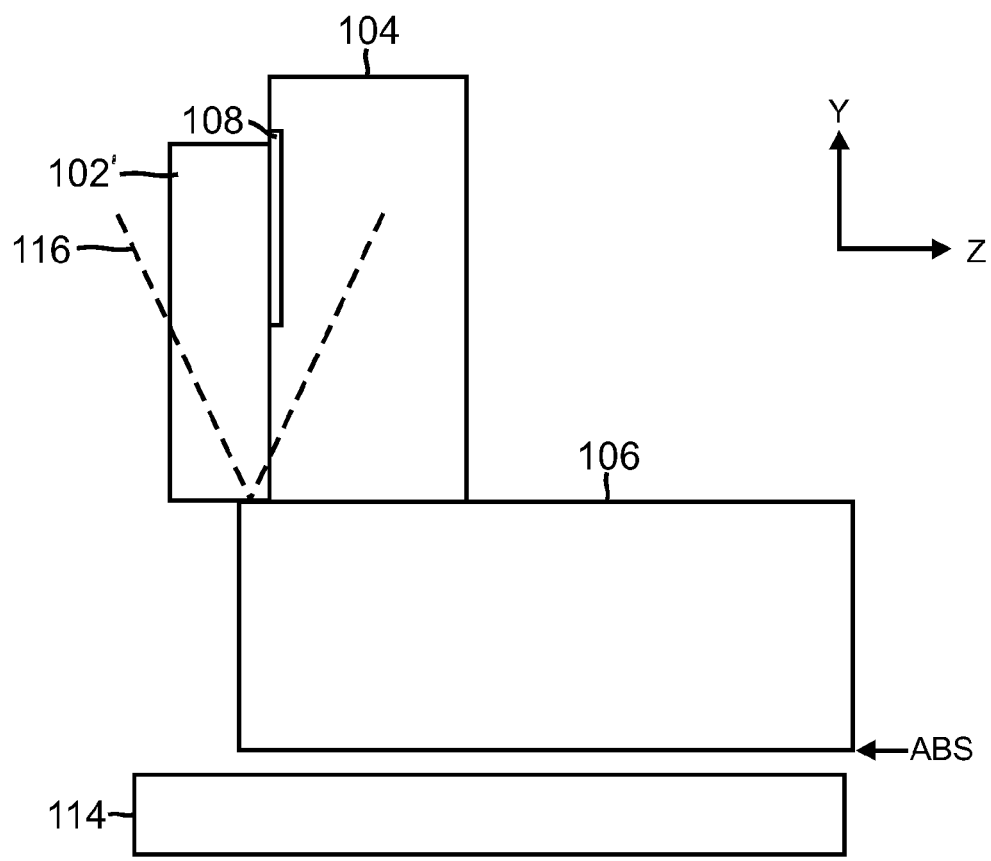
FIG. 2 is a side view of an EAMR assembly configured to monitor the output power of a light source using a light detector in accordance with an embodiment of the present invention.

FIG. 2 is a side view of an EAMR assembly configured to monitor the output power of a light source 102' using the light detector 108 in the "junction down" configuration in accordance with an embodiment of the present invention. However, in other embodiments, the output of the light source 102 may be located at other suitable locations.

In one embodiment, the sub-mount 104 is made of silicon, aluminum nitride or another suitable material. In one embodiment, the light source 102 includes a laser made of gallium arsenide and/or other suitable materials such as aluminum or indium.

Figure 1C:
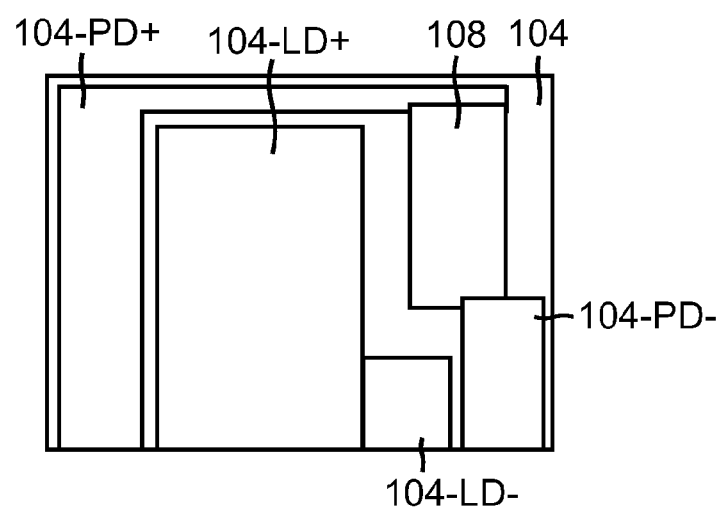
FIG. 1C is a side view of a sub-mount with metal traces for connecting a light source and a light detector in accordance with an embodiment of the present invention.

FIG. 1C is a side view of the sub-mount 104 with metal traces (104-PD+, 104-LD+, 104-LD−, 104-PD−) for connecting the light source 102 and the light detector 108 in accordance with an embodiment of the invention. Referring to FIG. 1C, electrical connection points or pads (104-LD+ and 104-LD−) are provided for electrically connecting the light source 102 to other circuits (not shown). For example, a power supply may be connected to the connection points 104-LD+ and 104-LD− to apply a suitable driving voltage to the light source 102. The electrical connection points or pads (104-PD+ and 104-PD−) are provided for electrically connecting the light detector 108 to other circuits (not shown). For example, the connection points (104-PD+ and 104-PD−) may be connected to an input buffer, a signal conditioner, a signal amplifier, or other suitable circuits. In some embodiments, soldering using solder jet balls may be used to secure the electrical connections.

Figure 3A:
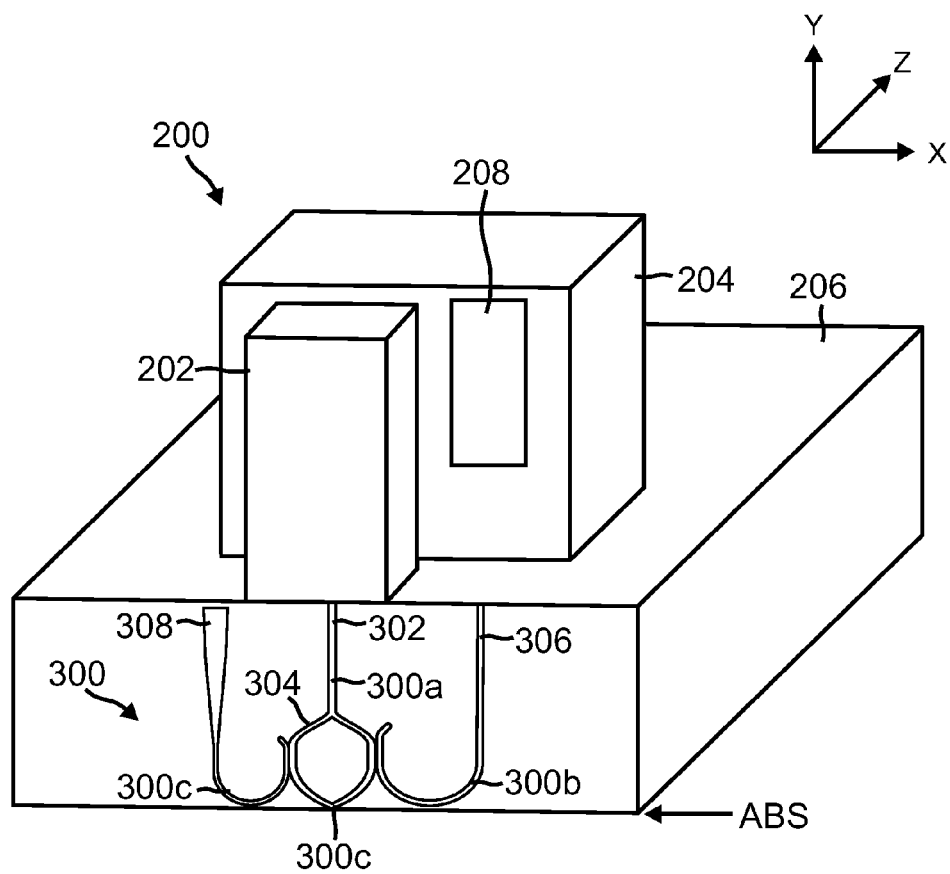
FIGS. 3A and 3B are a perspective view and a side view, respectively, of an EAMR assembly configured to monitor the output power of a light source using a light detector in accordance with an embodiment of the present invention.
Figure 3B:
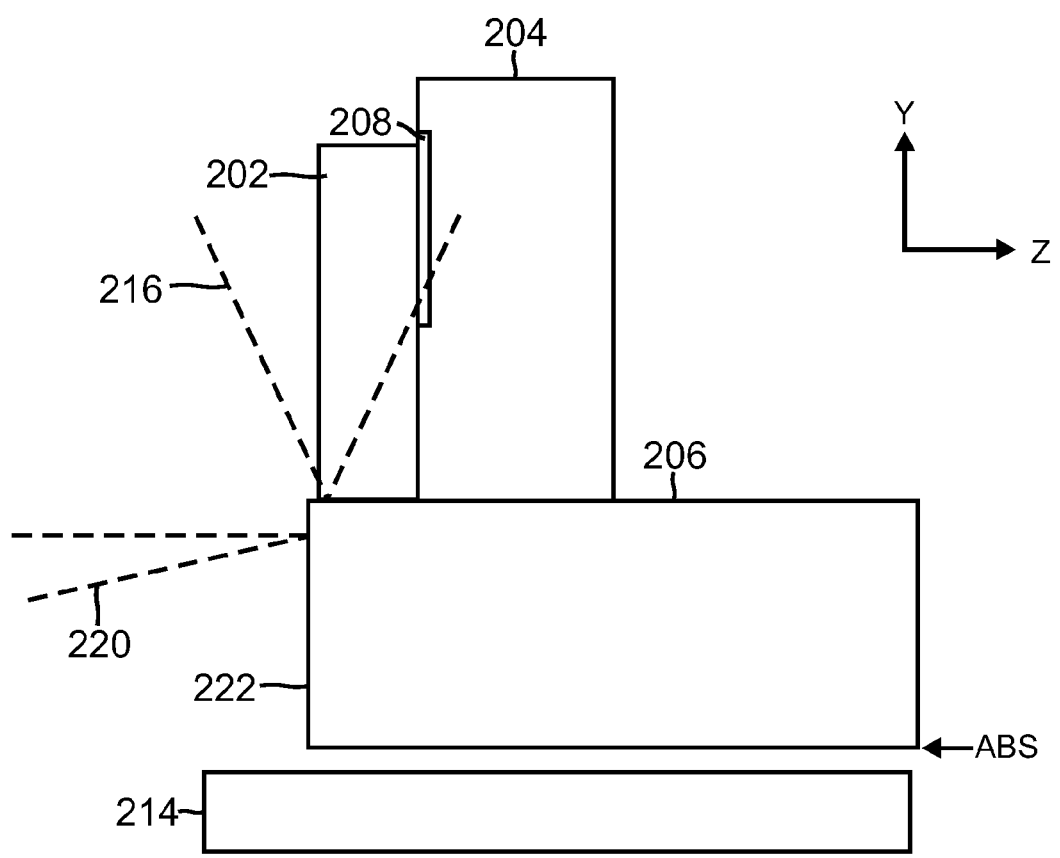

FIGS. 3A and 3B are a perspective view and a side view, respectively, of an EAMR assembly 200 configured to monitor the output power of a light source using a light detector in accordance with an embodiment of the present invention. The EAMR assembly 200 is substantially similar to the EAMR assembly 100, and redundant description of the embodiments may be omitted for clarity. Referring to FIG. 3A, the EAMR assembly 200 includes a light source 202 (e.g., a laser diode) attached to a first surface of a sub-mount 204 that is mounted on a top surface (or side) of a slider 206. The top surface is opposite to the ABS of the slider 206. In one embodiment, the light source 202 includes a laser diode for outputting a light beam to the slider 206 below. In one embodiment, the sub-mount 204 has a light detector 208 that is integrated along the first surface of the sub-mount 204. Here, the light source 202 and the light detector 208 are spaced apart on the first surface and have lengths that extend in a height direction (e.g., in the Y direction in FIG. 3A, which is normal to the ABS) of the sub-mount 204.

In one embodiment, the light detector 208 includes a photodiode such as an in-plane photodiode or a discrete photodiode. The light detector 208 may be attached to or integrally formed along the surface of the sub-mount 204.

The EAMR assembly 200 also includes a dual tap waveguide 300 in the slider 206. The waveguide 300 includes a first arm 300a for receiving light at a first end 302 or an input port from the light source 202. A suitable input device (e.g., grating or coupling lens) may be used to couple incident light into the waveguide 300. The waveguide 300 also includes a second arm 300b and a third arm 300c that are optically coupled with the first arm 300a. The first arm 300a branches into two coupling waveguides 304. In one embodiment, the second arm 300b and the third arm 300c are adjacent to or spaced apart from the coupling waveguides 304 to enable a preselected degree of optical coupling between the first arm 300a, the second arm 300b, and the third arm 300c. The waveguide 300 may be formed of dielectric oxide layers, an organic material, glass, or other suitable materials.

The waveguide 300 guides a first portion of the received light to an NFT end 300c located near an ABS of the slider 206. The first portion of the light may be transferred at the end 300c to a recording media disk 214 (See FIG. 3B) to be located near the ABS of the slider. A second portion of the light received by the first arm 300a is transferred to the second arm 300b and exits the second arm 300b at an end 306 toward the light detector 208. A third portion of the light received by the first arm 300a is transferred to the third arm 300c and exits the waveguide at an end 308 or an output port. The waveguide 300 may include a suitable output device (e.g., grating or coupling lens) at the end 308 of the third arm 300c. In one embodiment, a third portion of the light exits from a trailing edge surface 222 of the slider 206 and may be monitored by another light detector (not shown) in an apparatus used during testing or manufacturing of the EAMR assembly 200.

Referring to FIG. 3B, the first portion of the light beam after exiting the second arm 300b has a divergent shape 216. That is, the light beam's width gradually increases in a light propagation direction toward the light detector 208 located along the first surface of the sub-mount 204. Therefore, at least some of the light can be received or captured by the light detector 208. In one example, light detector 208 may include a photodiode, but the present invention is not limited thereto. Other suitable light detectors that can be applied with the sub-mount 204 may be used. In the embodiment of FIG. 3B, the rectangular block shaped light source 202 is mounted such that its output emanates from the side furthest from the sub-mount 204 (e.g., in a "junction up" configuration). In some embodiments, a light source 202 has a configuration in which the light source is mounted such that its output emanates from a side attached or immediately adjacent to the sub-mount 204 (e.g., in a "junction down" configuration of FIG. 2). However, in other embodiments, the output of the light source 202 may be located at other suitable locations.

Figure 4:
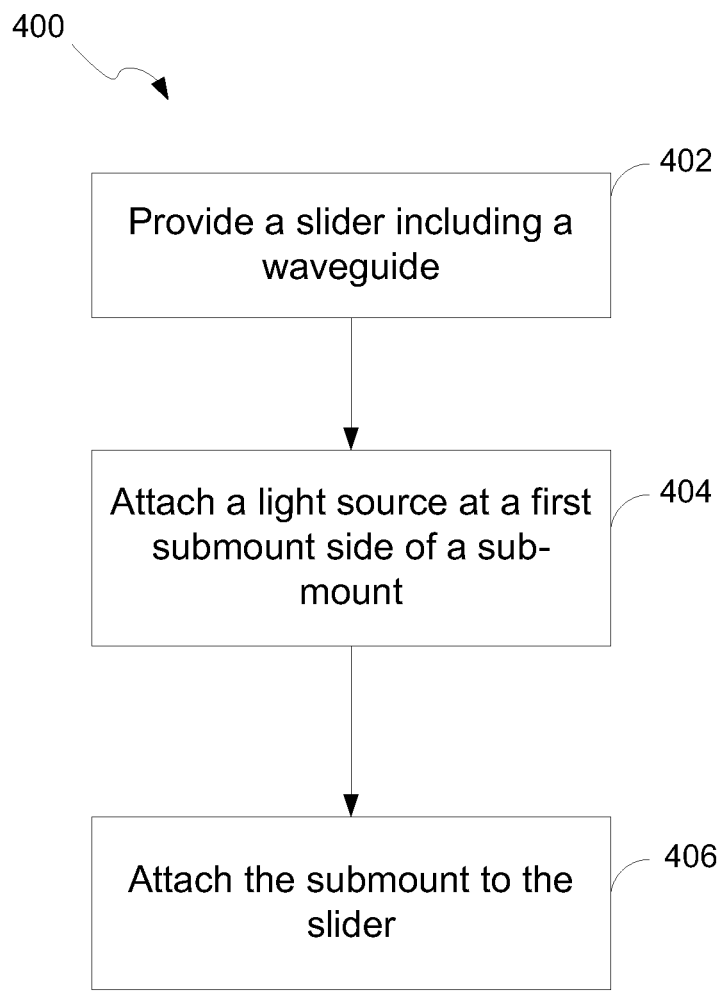
FIG. 4 is a flow chart of a process for assembling an EAMR assembly configured to monitor the output power of a light source using a light detector, a sub-mount, and a waveguide within a slider in accordance with an embodiment of the present invention.

FIG. 4 is a flow chart of a process 400 for assembling an EAMR assembly (e.g., EAMR assemblies 100 and 200) configured to monitor the output power of a light source using a light detector, a sub-mount, a waveguide within a slider in accordance with an embodiment of the present invention. The process provides (402) a slider (e.g., sliders 106, 206) including a waveguide (e.g., waveguides 110 and 300). The process attaches (404) a light source (e.g., light sources 102, 202) at a first sub-mount side of a sub-mount (e.g., sub-mounts 104, 204). Here, the light source is configured to transmit light to the waveguide. Electrical pads may be provided on opposing sides of the light source and the sub-mount for attaching the light source to the sub-mount. In some embodiments, the light source and the sub-mount may be attached together by soldering or other suitable methods known in the art.

After the light source is attached to the sub-mount, the process attaches (406) the sub-mount to the slider. Electrical pads may be provided on opposing sides of the sub-mount and the slider for attaching the sub-mount to the slider. In some embodiments, the sub-mount and the slider may be attached together by soldering or other suitable methods known in the art. The sub-mount includes a suitable light detector (e.g., light detectors 108, 208) that is located along the first sub-mount side of the sub-mount and spaced apart from the slider. The light detector is configured to receive a first portion of the light transmitted to the waveguide. In this embodiment, light enters and exits the waveguide at the same side or surface of the slider. Light enters and exits the waveguide in opposite directions. In one embodiment, the sub-mount and the light source have about the same height in a direction normal to the ABS. In one embodiment, the light source and the light detector extend side-by-side in the height direction of the sub-mount.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 5:
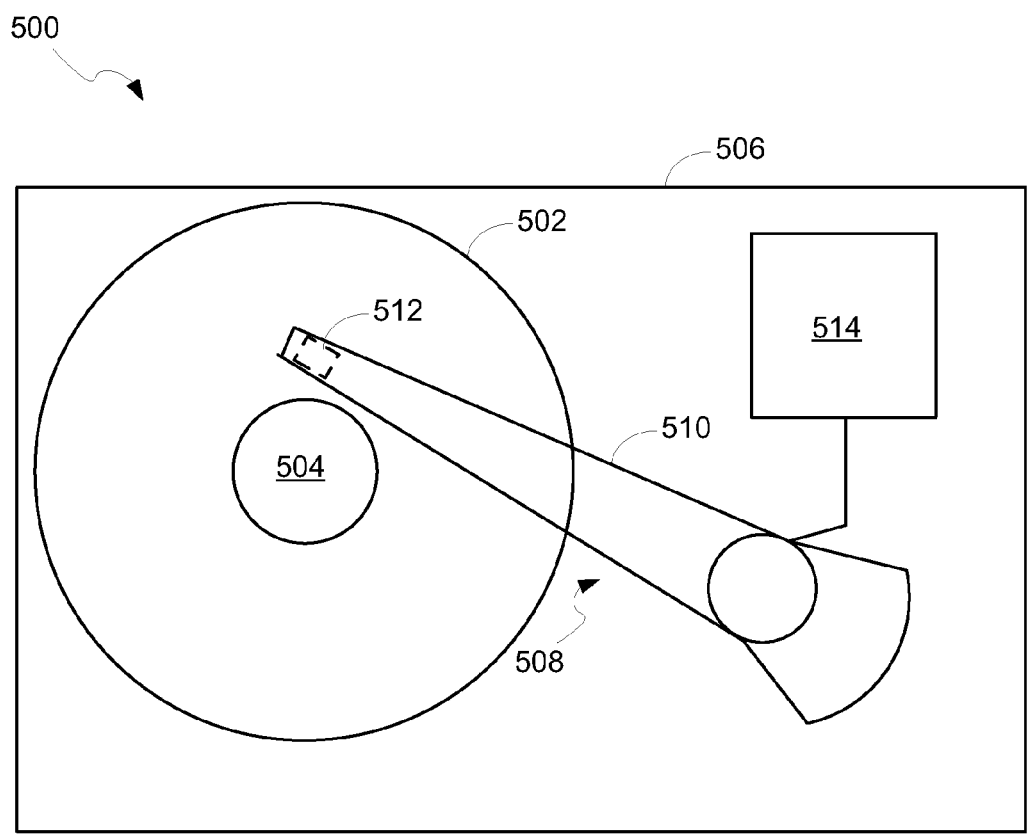
FIG. 5 is a drawing illustrating a disk drive including a head gimbal assembly configured to monitor the output power of a light source using a light detector in accordance with an embodiment of the present invention.

In one embodiment, the present invention relates to a head gimbal assembly. FIG. 5 illustrates a disk drive 500 including a head gimbal assembly (HGA) 508 configured to monitor the output power of a light source using a light detector in accordance with an embodiment of the present invention. Disk drive 500 may include one or more disks 502 to store data. The disk 502 resides on a spindle assembly 504 that is mounted to a drive housing 506. Data may be stored along tracks in a magnetic recording layer of the disk 502. The HGA 508 includes a suspension assembly 510 and an energy-assisted magnetic recording (EAMR) assembly 512 (e.g., EAMRs 100, 200).

The disk drive 500 also includes a spindle motor (not shown) that rotates the spindle assembly 504 and, thereby, the disk 502 to position the EAMR assembly 512 at a particular location along a desired disk track. The position of the EAMR assembly 512 relative to the disk 502 may be controlled by a position control circuitry 514. Components of the disk drive 500 that are generally known in the art and not necessary for understanding the present invention, are omitted for clarity.

Figure 6:
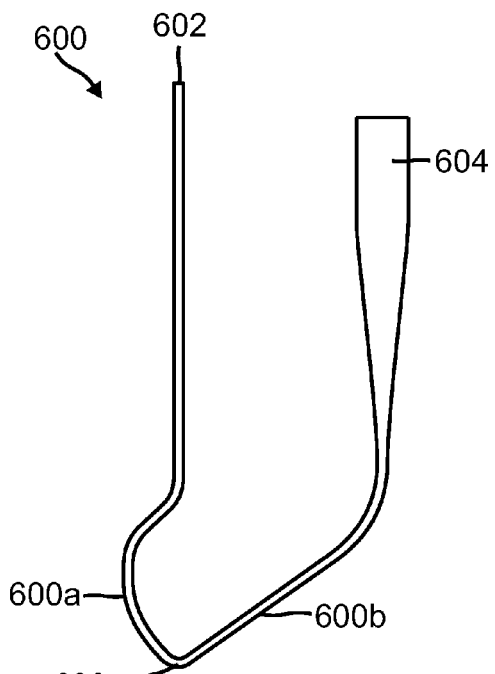
FIG. 6 is a drawing conceptually illustrating a single tap waveguide for a slider in accordance with an embodiment of the present invention.

FIGS. 6-9 are drawings conceptually illustrating various waveguide designs in accordance with embodiments of the present invention. In particular embodiments, these waveguides may be used as the waveguides in the sliders 106 and 206. FIG. 6 illustrates a single tap waveguide 600 for an EAMR assembly in accordance with an embodiment of the present invention. The waveguide 600 includes a first arm 600a and a second arm 600b that is optically coupled with the first arm 600a. In some embodiments, the first arm 600a may be coupled to the second arm 600b via a third arm (not shown). The waveguide 600 may include a suitable input device (e.g., grating) at a first end 602 or an input port of the first arm 600a for coupling light into the first arm 600a. In other embodiments, other suitable optical structures (e.g., coupling lens) may be used to couple light into the waveguide 600. The waveguide 600 may be formed of dielectric oxides, an organic material, glass, or other suitable materials. The waveguide 600 also includes an NFT end 600c to be located near an ABS of a slider (e.g., sliders 106, 206). A first portion of the light received by the first arm 600a may be transferred at this end 600c to a recording media disk (e.g., recording media disks 114, 214) to be located near the ABS of a slider having such waveguide. A second portion of the light received by the first arm 600a is transferred to the second arm 600b. The second portion of the light is guided by the second arm 600b to a second end 604 or output port thereof. In some embodiments, the waveguide 600 may include an output device (e.g., grating or coupling lens) at the second end 604. The waveguide 600 may be formed of an organic material, glass, or other suitable materials.

Figure 7:
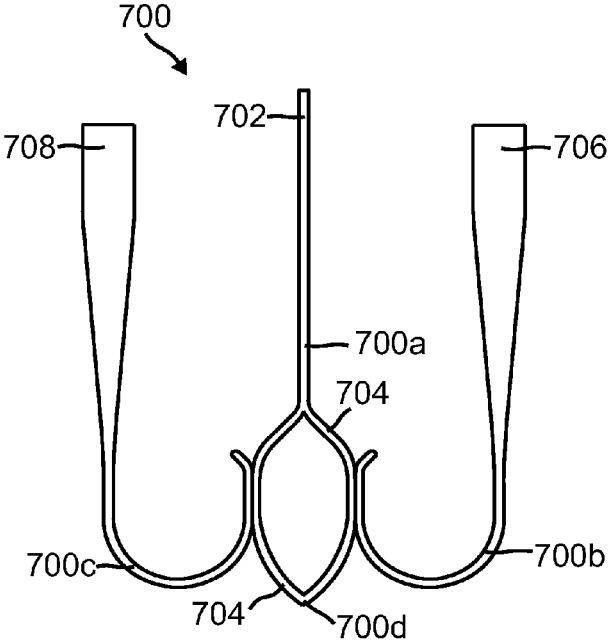
FIG. 7 is a drawing conceptually illustrating a dual tap coupling waveguide for a slider in accordance with an embodiment of the present invention.

FIG. 7 is a drawing conceptually illustrating a dual tap coupling waveguide 700 for an EAMR assembly in accordance with an embodiment of the present disclosure. The waveguide 700 may be used as the waveguide in the slider 106 or 206. Referring to FIG. 7, the waveguide 700 includes a first arm 700a for receiving light at a first end 702 or an input port from a light source (e.g., light source 102 in FIG. 1A). A suitable input device (e.g., grating or coupling lens) may be used to couple incident light into the waveguide 700. The waveguide 700 also includes a second arm 700b and a third arm 700c that are optically coupled with the first arm 700a. The first arm 700a branches (e.g., splits) into two coupling waveguides 704. In one embodiment, the second arm 700b and the third arm 700c are adjacent to or spaced apart from the coupling waveguides 704 to enable a preselected degree of optical coupling between the first arm 700a, the second arm 700b, and the third arm 700c. The waveguide 700 may be formed of an organic material, glass, or other suitable materials.

The waveguide 700 may include an NFT end 700d to be located near a writing pole of a slider (e.g., slider 106 in FIG. 1A). A first portion of the light received by the first arm 700a may be transferred at this NFT end 700d to a recording media disk (e.g., media disk 114 in FIG. 1A) to be located near an ABS of the slider. A second portion of the light received by the first arm 700a is transferred to the second arm 700b and exits the second arm 700b at an end 706 or output port thereof. A suitable output device (e.g., grating or coupling lens) may be located at the end 706 of the second arm 700b. A third portion of the light received by the first arm 700a is transferred to the third arm 700c and exits the waveguide at an end 708 or output port of the third arm 700c. The waveguide 700 may include a suitable output device (e.g., grating or coupling lens) at the end of the third arm 700c. In one embodiment, the light that exits end 708 of the third arm 700c may be monitored by a light detector in an apparatus used during testing or manufacturing of an EAMR assembly including the waveguide 700, while the light that exits end 706 can be monitored by a light detector on the sub-mount (e.g., light detector 108 in FIGS. 1A, 1B, and 1C). The widths of the second arm 700b and third arm 700c gradually increase toward the respective ends 706 and 708.

Figure 8:
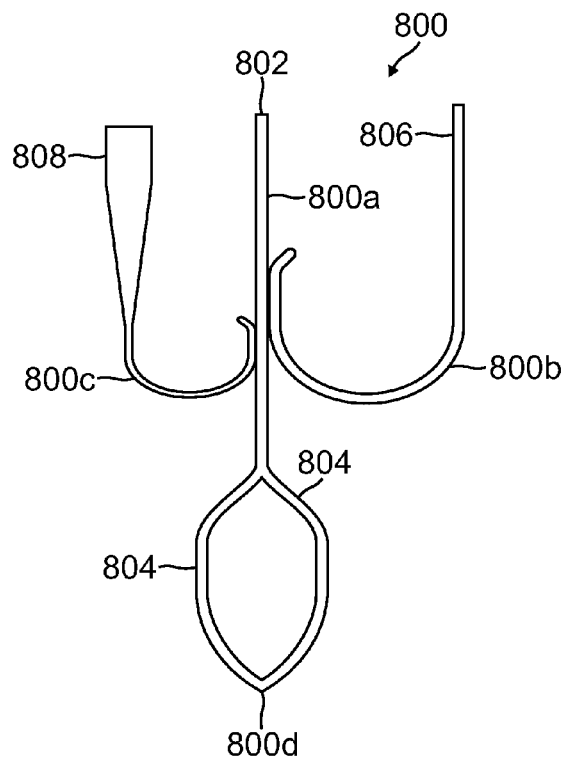
FIG. 8 is a drawing conceptually illustrating a dual tap coupling waveguide for a slider in accordance with an embodiment of the present invention.

FIG. 8 is a drawing conceptually illustrating a dual tap coupling waveguide 800 for an EAMR assembly in accordance with an embodiment of the present disclosure. The waveguide 800 may be used as the waveguide in the sliders 106 and 206. Referring to FIG. 8, the waveguide 800 includes a first arm 800a for receiving light at a first end 802 or an input port from a light source. The waveguide 800 also includes a second arm 800b and a third arm 800c that are optically coupled with the first arm 800a. The first arm 800a branches (e.g., splits) into two waveguides 804. In one embodiment, the second arm 800b and the third arm 800c are adjacent to or spaced apart from the first arm 800a to enable a preselected degree of optical coupling among the first arm 800a, the second arm 800b, and the third arm 800c. The waveguide 800 may be formed of an organic material, glass, or other suitable materials.

The waveguide 800 also includes an NFT end 800d to be located near a writing pole of a slider (e.g., slider 106 in FIG. 1A). A first portion of the light received by the first arm 800a may be transferred at this end 800d to a recording media disk (e.g., media disk 114 in FIG. 1A) to be located near an ABS of the slider. A second portion of the light received by the first arm 800a is transferred to the second arm 800b and exits the second arm 800b at an end 806 or output port thereof. A third portion of the light received by the first arm 800a is transferred to the third arm 800c and exits the waveguide at an end 808. The waveguide 800 may include a suitable output device (e.g., grating or coupling lens) at the end 808 of the third arm 800*c*. The width of the third arm 800*c* gradually increases toward the end 808.

While the second arm 800*b* and the third arm 800*c* are shown to have particular widths and lengths in the figure, the illustrated shapes and dimensions are only illustrative and the embodiments of the present disclosure are not limited to any particular dimensions or shapes. In some aspects, the second arm 800*b* and the third arm 800*c* may have substantially the same width at least in some sections. In some aspects, the second arm 800*b* and the third arm 800*c* may be symmetrical or asymmetrical with respect to the first arm 800*a*. In some aspects, the second arm 800*b* and the third arm 800*c* may be coupled to other sections of the first arm 800*a*. In some examples, the second arm 800*b* and the third arm 800*c* may be coupled to the same side (left side in FIG. 8) of the first arm 800*a*, and in some other examples, the second arm 800*b* and the third 800*c* may be coupled to different sides of the first arm 800*a*. In other examples, the sections of 800*b* and 800*c* that couple with (e.g., those sections immediately adjacent to) arm 800*a* can have different lengths than those shown in FIG. 8. In one such example, the lengths are equal rather than unequal as depicted in FIG. 8. The coupling sections of 800*b* and 800*c* can be positioned in different configurations than those illustrated. For example, the coupling sections of 800*b* and 800*c* can be adjacent to one another rather than offset as depicted in FIG. 8.

Figure 9:
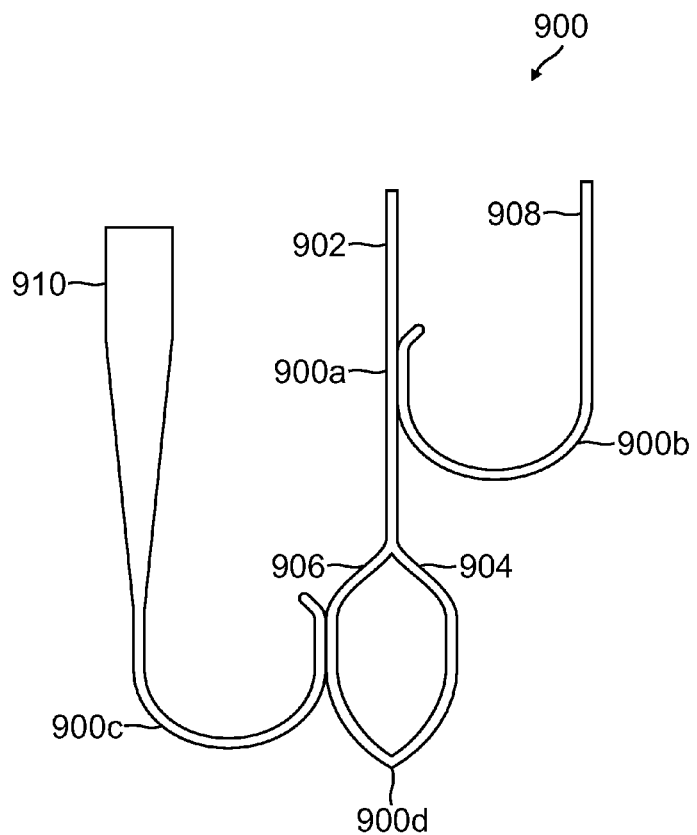
FIG. 9 is a drawing conceptually illustrating a dual tap coupling waveguide for a slider in accordance with an embodiment of the present invention.

FIG. 9 is a drawing conceptually illustrating a dual tap coupling waveguide 900 for an EAMR assembly in accordance with an embodiment of the present disclosure. The waveguide 900 may be used as the waveguide in the sliders 106 and 206. Referring to FIG. 9, the waveguide 900 includes a first arm 900*a* for receiving light at a first end 902 or an input port from a light source (e.g., light source 102 in FIG. 1A). The waveguide 900 also includes a second arm 900*b* and a third arm 900*c* that are optically coupled with the first arm 900*a*. The first arm 900*a* branches (e.g., splits) into two waveguides 904 and 906. The second arm 900*b* is adjacent to or spaced apart from the first arm 900*a* to enable a preselected degree of optical coupling between the first arm 900*a* and the second arm 900*b*. The third arm 900*c* is adjacent to or spaced apart from the waveguide 906 to enable a preselected degree of optical coupling between the waveguide 906 and the third arm 900*c*. The waveguide 900 may be formed of an organic material, glass, or other suitable materials.

The waveguide 900 may include an NFT end 900*d* to be located near a writing pole of a slider (e.g., slider 106 in FIG. 1A). A first portion of the light received by the first arm 900*a* may be transferred at this end 900*d* to a recording media disk (e.g., media disk 114 in FIG. 1A) to be located near an ABS of the slider. A second portion of the light received by the first arm 900*a* is transferred to the second arm 900*b* and exits the second arm 900*b* at an end 908 or output port thereof. A third portion of the light received by the first arm 900*a* is transferred to the third arm 900*c* and exits the waveguide at an end 910. The waveguide 900 may include a suitable output device (e.g., grating or coupling lens) at the end 910. In one embodiment, the light that exits the end 910 may be monitored by a light detector in an apparatus used during testing or manufacturing of an EAMR assembly including the waveguide 900, while the light that exits the end 908 can be monitored by a light detector on the sub-mount (e.g., light detector 108 in FIGS. 1A, 1B, 1C). The width of the third arm 900*c* gradually increases toward the end 910. FIGS. 6-9 are illustrative embodiments of waveguide that may be utilized in the present invention, which is not limited thereto.

Figure 10:
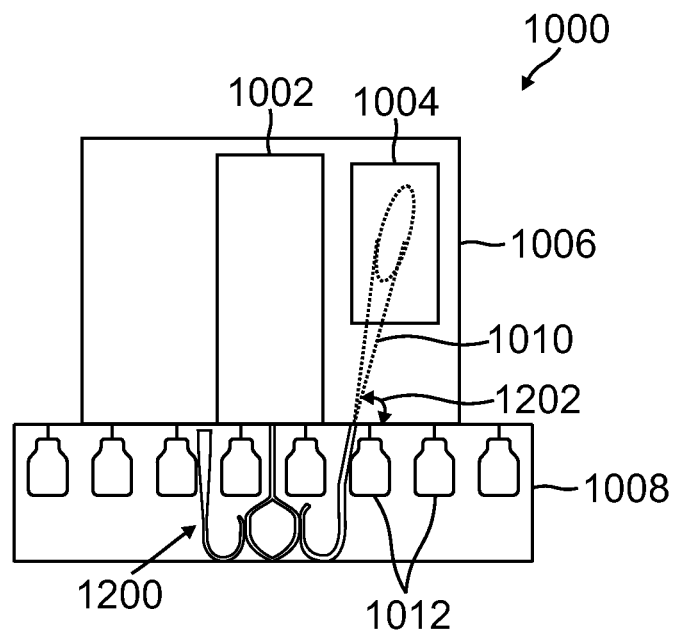
FIGS. 10 and 11 are drawings illustrating EAMR assemblies in accordance with embodiments of the present invention in which light is emitted at an angle with respect to a top surface of a slider.
Figure 11:
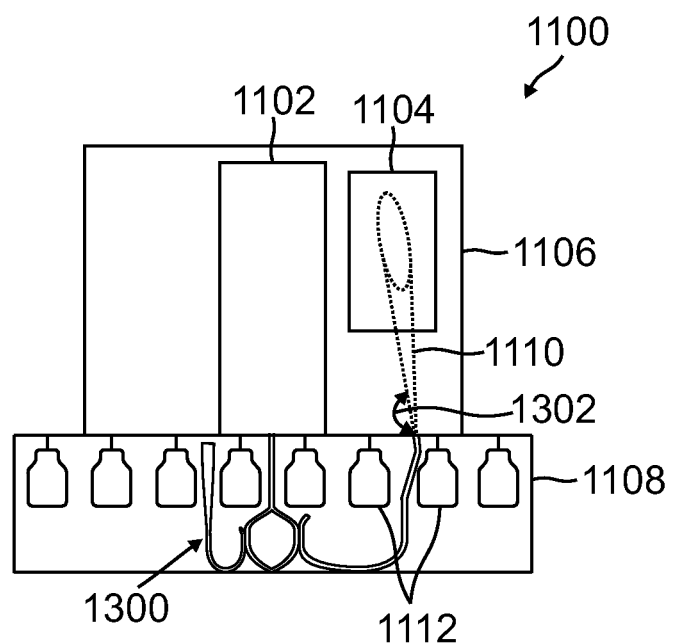

In the above described embodiments, light may be emitted from a waveguide in a direction substantially normal to the top surface of the slider and may be captured by a light detector along a side surface of a sub-mount. Due to design and manufacturing constraints, however, the position of the exit waveguide and the light detector's active area may not be ideally located. For example, the exit waveguide may have different locations for 8-pad and 9-pad sliders. FIGS. 10 and 11 are drawings illustrating EAMR assemblies 1000 and 1100 in accordance with embodiments of the present invention in which light is emitted at an angle (e.g., non-ninety degree angle) with respect to the top surface of a slider.

In FIG. 10, an EAMR assembly 1000 includes a light source 1002 and a light detector 1004 that are attached to a surface of a sub-mount 1006. The sub-mount 1006 may be mounted on a top surface of an eight-pad slider 1008. A waveguide 1200 (similar to the waveguide 300 of FIG. 3A) in the slider 1008 receives light from the light source 1002 and emits a portion 1010 of the received light between two pads 1012 at an angle 1202 (i.e., not normal to the top surface of the slider 1008) with respect to the top surface of the slider 1008. In FIG. 11, an EAMR assembly 1100 includes a light source 1102 and a light detector 1104 that are attached to a surface of a sub-mount 1106. The sub-mount 1106 is mounted on a top surface of a nine-pad slider 1108. A waveguide 1300 (similar to the waveguide 300) in the slider 1108 receives light from the light source 1102 and emits a portion 1110 of the received light between two pads 1112 at an angle 1302 (i.e., not normal to the top surface of the slider 1108) with respect to the top surface of the slider 1108.

In FIGS. 10 and 11, the angle can be tuned based on the allowable positions of the waveguide and the light detecting area of the light detector 1004. The actual angle of emission will depend on the geometric angle and the indices of refraction of the waveguide material and the hard drive atmosphere.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. An energy-assisted magnetic recording (EAMR) head comprising:
 a slider comprising a waveguide;
 a sub-mount fixedly attached to the slider, the sub-mount comprising a light detector along a first sub-mount side of the sub-mount and spaced apart from the slider; and
 a light source attached to the first sub-mount side, the light source configured to generate and transmit light to the waveguide,
 wherein the light detector is configured to receive a first portion of the light transmitted to the waveguide.

2. The EAMR head of claim 1, wherein the waveguide comprises a first end and a second end both located at a surface of the slider opposite an air bearing surface of the slider.

3. The EAMR head of claim 2, wherein the waveguide is configured such that the light enters the waveguide at the first end and in a first direction, and the first portion of the light exits the waveguide at the second end and in a second direction that is substantially opposite to the first direction.

4. The EAMR head of claim 3, wherein the waveguide is configured such that the first portion of the light exits the waveguide at an angle with respect to the surface of the slider.

5. The EAMR head of claim 4, wherein the angle is substantially normal to the surface of the slider.

6. The EAMR head of claim 4, wherein the angle is not normal to the surface of the slider.

7. The EAMR head of claim 1, wherein the light source comprises a laser diode, and the light detector comprises a photodiode.

8. The EAMR head of claim 7, wherein the photodiode is integrally formed in the sub-mount.

9. The EAMR head of claim 7, wherein the photodiode is attached to the sub-mount.

10. The EAMR head of claim 7, wherein the photodiode comprises an in-plane photodiode.

11. The EAMR head of claim 1, wherein the waveguide comprises a first arm for transmitting the first portion of the light to the light detector.

12. The EAMR head of claim 11, wherein the first arm extends to a surface of the slider opposite an air bearing surface of the slider.

13. The EAMR head of claim 11, wherein a section of the first arm gradually increases in width in a light propagating direction toward the light detector.

14. The EAMR head of claim 11,
wherein the waveguide further comprises a second arm for receiving the light from the light source, and the first arm is configured to receive the first portion of the light from the second arm, and
wherein the second arm is configured to transmit a second portion of the light to a storage medium located proximate an air bearing surface of the slider.

15. The EAMR head of claim 14, further comprising a near-field transducer located proximate the air bearing surface of the slider and optically coupled with the second arm of the waveguide for transferring energy of the second portion of the light to a location on the storage medium.

16. The EAMR head of claim 14, wherein the waveguide further comprises a third arm for transmitting a third portion of the light to a second light detector.

17. The EAMR head of claim 16, wherein the third arm extends to a trailing edge side of the slider.

18. The EAMR head of claim 17, wherein the third arm is configured to emit the third portion of the light from the trailing edge side of the slider.

19. The EAMR head of claim 16, wherein the first arm and the third arm are substantially symmetrical in shape.

20. The EAMR head of claim 16, wherein second arm splits into two branches that are optically coupled to the first arm and the third arm, respectively.

21. The EAMR head of claim 16,
wherein the first arm and the third arm are spaced apart from the second arm; and
wherein the first arm and the third arm are optically coupled with the second arm.

22. The EAMR head of claim 1, wherein the waveguide comprises one selected from the group consisting of a channel waveguide, a planar waveguide, and a combination thereof.

23. The EAMR head of claim 1, wherein the waveguide is configured to output the first portion of the light as a light beam with a divergent portion that extends toward the light detector.

24. The EAMR head of claim 1, wherein the light source has a first light source side attached to the first sub-mount side and a second light source side opposite the first light source side, and the light source is configured to output the light at the first light source side.

25. The EAMR head of claim 1, wherein the light source has a first light source side attached to the first sub-mount side and a second light source side opposite the first light source side, and the light source is configured to output the light at the second light source side.

26. The EAMR head of claim 1, further comprising a plurality of metal traces on the sub-mount and electrically coupled to the light source and light detector, respectively.

27. The EAMR head of claim 1, wherein the light source and the light detector extend side-by-side in a height direction of the sub-mount, wherein the height direction is normal to an air bearing surface of the slider.

28. The EAMR head of claim 1, wherein the sub-mount and the light source have about the same height in a direction normal to an air bearing surface of the slider.

29. The EAMR head of claim 1, wherein the first sub-mount side extends in a direction substantially normal to an air bearing surface of the slider.

30. The EAMR head of claim 1, wherein the sub-mount is directly attached to the slider.

31. The EAMR head of claim 1, wherein the light detector is configured to receive light emitted from the waveguide.

32. A method of fabricating an energy-assisted magnetic recording (EAMR) head, the method comprising:
providing a slider comprising a waveguide;
attaching a light source at a first sub-mount side of a sub-mount, the light source configured to generate and transmit light to the waveguide; and
fixedly attaching the sub-mount to the slider, the sub-mount comprising a light detector along the first sub-mount side of the sub-mount and spaced apart from the slider,
wherein the light detector is configured to receive a first portion of the light transmitted to the waveguide.

33. The method of claim 32, wherein the waveguide comprises a first end and a second end both located at a surface of the slider opposite an air bearing surface of the slider.

34. The method of claim 33, wherein the waveguide is configured such that the light enters the waveguide at the first end in a first direction, and the first portion of the light exits the waveguide at the second end in a second direction that is opposite to the first direction.

35. The method of claim 34, wherein the waveguide is configured such that the first portion of the light exits the waveguide at an angle with respect to the surface of the slider.

36. The method of claim 35, wherein the angle is substantially normal to the surface of the slider.

37. The method of claim 35, wherein the angle is not normal to the surface of the slider.

38. The method of claim 32, wherein the light source comprises a laser diode, and the light detector comprises a photodiode.

39. The method of claim 38, wherein the photodiode is integrally formed in the sub-mount.

40. The method of claim 38, wherein the photodiode is attached to the sub-mount.

41. The method of claim 38, wherein the photodiode is an in-plane photodiode.

42. The method of claim 32, wherein the waveguide comprises a first arm for transmitting the first portion of the light to the light detector.

43. The method of claim 42, wherein the first arm extends to a surface of the slider opposite an air bearing surface of the slider.

44. The method of claim 42, wherein a section of the first arm gradually increases in width in a light propagating direction toward the light detector.

45. The method of claim 42,
wherein the waveguide further comprises a second arm for receiving the light from the light source, and the first arm is configured to receive the first portion of the light from the second arm, and
wherein the second arm is configured to transmit a second portion of the light to a storage medium located proximate an air bearing surface of the slider.

46. The method of claim 45, wherein the waveguide further comprises a third arm for transmitting a third portion of the light to a second light detector.

47. The method of claim 46, wherein the third arm extends to a trailing edge side of the slider.

48. The method of claim 47, wherein the third arm is configured to emit the third portion of the light from the trailing edge side of the slider.

49. The method of claim 46, wherein the first arm and the third arm are substantially symmetrical in shape.

50. The method of claim 46, wherein second arm splits into two branches that are optically coupled to the first arm and the third arm, respectively.

51. The method of claim 46,
wherein the first arm and the third arm are spaced apart from the second arm; and
wherein the first arm and the third arm are optically coupled with the second arm.

52. The method of claim 45, further comprising forming a near-field transducer located proximate the air bearing surface of the slider and optically coupled with the second arm of the waveguide for transferring energy of the second portion of the light to a location on the storage medium.

53. The method of claim 32, wherein the waveguide comprises one selected from the group consisting of a channel waveguide, a planar waveguide, and a combination thereof.

54. The method of claim 32, wherein the waveguide is configured to output the first portion of the light as a light beam with a divergent portion that extends toward the light detector.

55. The method of claim 32, wherein the light source has a first light source side attached to the first sub-mount side and a second light source side opposite the first light source side, and the light source is configured to output the light at the first light source side.

56. The method of claim 32, wherein the light source has a first light source side attached to the first sub-mount side and a second light source side opposite the first light source side, and the light source is configured to output the light at the second light source side.

57. The method of claim 32, further comprising forming a plurality of metal traces on the sub-mount and electrically coupled to the light source and light detector, respectively.

58. The method of claim 32, wherein the light source and the light detector extend side-by-side in a height direction of the sub-mount, wherein the height direction is normal to an air bearing surface of the slider.

59. The method of claim 32, wherein the sub-mount and the light source have about the same height in a direction normal to an air bearing surface of the slider.

60. The method of claim 32, wherein the first sub-mount side extends in a direction substantially normal to an air bearing surface of the slider.

61. The method of claim 32, wherein the sub-mount is directly attached to the slider.

62. The method of claim 32, wherein the light detector is configured to receive light emitted from the waveguide.

63. A head-gimbal assembly (HGA) comprising:
a suspension assembly; and
an energy-assisted magnetic recording (EAMR) head of claim 1 connected with the suspension assembly.

* * * * *